Oct. 20, 1936.　　　D. F. SMALLEY　　　2,058,362

LAMINATED CORE FOR ELECTRICAL APPARATUS

Filed March 28, 1936

Inventor:
Dean F. Smalley,
by Harry E. Dunham
His Attorney.

Patented Oct. 20, 1936

2,058,362

UNITED STATES PATENT OFFICE 2,058,362

LAMINATED CORE FOR ELECTRICAL APPARATUS

Dean F. Smalley, East Lynn, Mass., assignor to General Electric Company, a corporation of New York Application March 28, 1936, Serial No. 71,518

8 Claims. (Cl. 171—252)

My invention relates to improvements in laminated cores for electrical apparatus and particularly to laminated field structures for dynamo-electric machines.

Various types of laminated core structures have been used to eliminate eddy-current losses in electrical apparatus and laminated cores for dynamo-electric machines have generally been made of an assembly of disks or annular punchings, or of an edgewise wound sheet metal helix. In making large machines, laminated cores made up of arcuate sectors of sheet metal secured together by rivets or the like, or arranged with adjacent sector ends in spaced relation have been proposed. In such constructions, when the laminated sector ends are secured together eddy-currents tend to flow from one sector to the next adjacent sector through the rivets or securing parts, and when the ends are spaced apart the useful magnetic length of the core is greatly decreased by the air spaces therein requiring extra ampere turns to overcome the increased reluctance in these air spaces, and the securing or clamping arrangement usually provides a conductive path between the laminated sectors for the eddy-currents generated in the laminations.

An object of my invention is to provide an improved core for electrical apparatus having low core losses and a simplified laminated core construction.

Further objects and advantages of my invention will become apparent and my invention will be better understood from the following description referring to the accompanying drawing, and the features of novelty which characterize my invention will be pointed out with particularity in the claims annexed to and forming a part of this specification.

Figure 1:
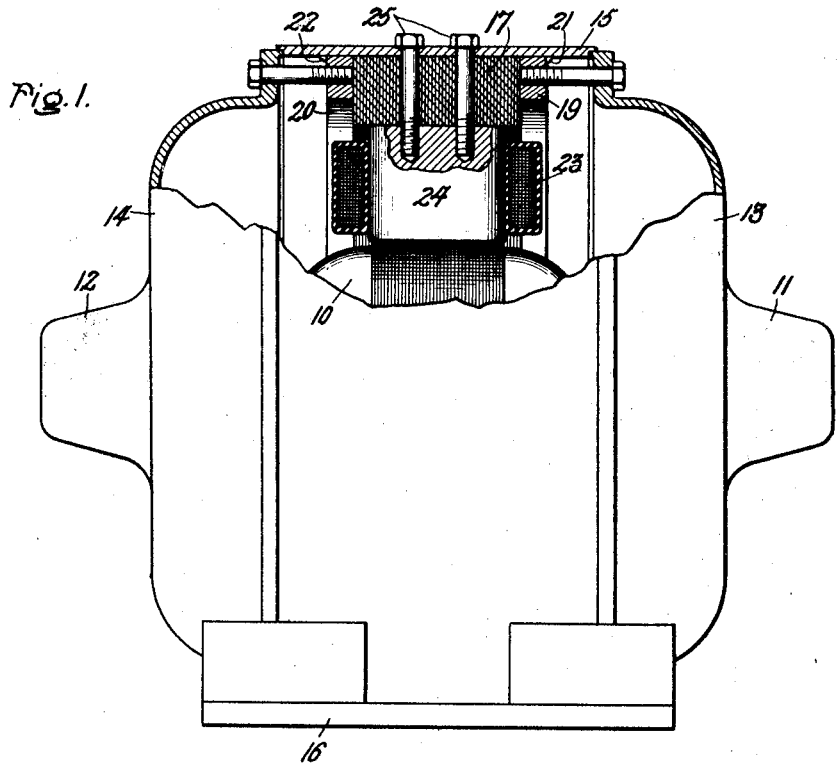
Figure 2:
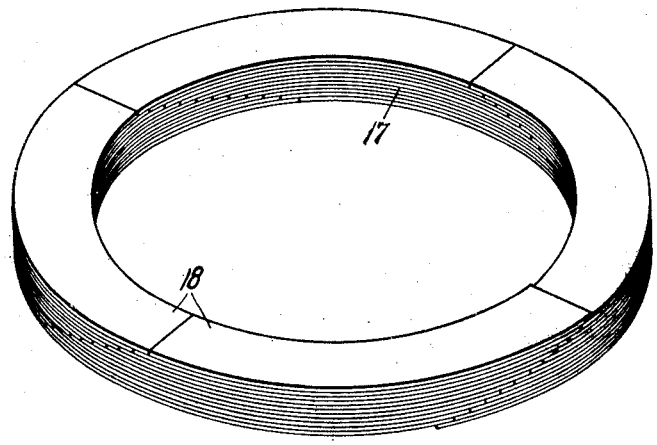

In the drawing, Fig. 1 is a side elevation in partial section of a dynamo-electric machine having a stationary member provided with an improved laminated core construction embodying my invention, and Fig. 2 is a perspective view of a core formed of laminated sheet metal sectors arranged according to my invention.

Referring to the drawing, in Fig. 1 I have illustrated a dynamo-electric machine provided with a rotatable member 10 mounted in bearings arranged in hubs 11 and 12 formed on end shields 13 and 14 secured to the stationary member of the dynamo-electric machine. The stationary member is provided with a cylindrical sheet metal frame 15 mounted on a supporting base 16. A laminated sheet metal core 17 of magnetic material formed of a plurality of arcuate sectors 18 is secured in position within the cylindrical frame 15 by end rings 19 and 20, tack welded at intervals around the periphery to the inner surface of the frame 15. The arcuate length of each of the arcuate sectors 18 is about 91°, as it is desirable that the length of arc should not be integrally divisible into 360 mechanical degrees, so that when the sectors 18 are assembled, it is not necessary to exactly fit the fourth sector between the first and third sectors to form a cylindrical core. Another advantage is that by making these arcuate sectors approximately 91°, very little disturbance of the flux is produced at the abutting ends of the laminated sectors, as the corresponding abutting ends of successive layers are displaced about 4° around the periphery of the core producing a continuous laminated spiral. In assembling these laminations, the sectors are arranged, as illustrated in Fig. 2, with adjacent ends of the separate arcuate sectors in abutting relation, without joining these abutting ends together, so that the electrically conductive path through the length or circumference of the laminations is greatly increased. The shell 15 and end rings 19 and 20 are then arranged about the laminations and a pressure of approximately 75 tons applied to the top of the stack of laminations. The end rings 19 and 20 are then tack welded, as shown at 21 and 22, to the cylindrical shell 15 to securely retain the laminations in assembled relation.

The field excitation of this dynamo-electric machine is provided by field exciting windings 23 mounted on pole pieces 24, which are arranged at intervals in circumferentially spaced relation about the inner surface of the laminated core 17 and are secured to the frame 15 by bolts 25 extending through openings in the laminated core 17 and threaded into the pole pieces 24. In this manner, the laminated core 17 is arranged between the frame 15 and the pole pieces 24, and forms the principal magnetic path of the stationary magnetic circuit outside the pole pieces 24, very little flux being carried through the frame 15 or the end rings 19 and 20.

Although I have shown and described a particular embodiment of my invention, I do not desire my invention to be limited to the construction described, and I intend in the appended claims to cover all modifications which do not depart from the spirit and scope of my invention.

What I claim as new and desire to secure by Letters Patent of the United States is:

1. A core for electrical apparatus including an assembly of laminations, said laminations comprising sheet metal arcuate sectors having abutting ends arranged in staggered relation to provide a continuous laminated spiral.

2. A core for electrical apparatus including an assembly of laminations, said laminations comprising sheet metal arcuate sectors of length of arc not integrally divisible into 360 degrees and having adjacent sector ends arranged in abutting relation to provide a continuous laminated spiral.

3. A core for electrical apparatus including an assembly of laminations, said laminations comprising sectors of length of arc not integrally divisible into 360 degrees and arranged with abutting ends to provide a continuous spiral, and means for retaining said laminations in assembled relation.

4. A field structure for dynamo-electric machines having a core including an assembly of laminations, said laminations comprising arcuate sheet metal sectors having abutting ends arranged in staggered relation to provide a continuous spiral, means including a frame for retaining said laminations in assembled relation, and a plurality of pole pieces secured to said laminated core.

5. A core for electrical apparatus including an assembly of laminations, said laminations comprising sheet metal arcuate sectors of slightly more than ninety degrees of arc and having adjacent sector ends arranged in abutting relation to provide a continuous laminated spiral.

6. A field structure for dynamo-electric machines including a frame and a plurality of pole pieces secured to said frame, and a core of magnetic material secured between said frame and said pole pieces, said core comprising sheet metal arcuate sectors of length of arc not integrally divisible into 360 degrees and having adjacent sector ends arranged in abutting relation to provide a continuous laminated spiral.

7. A dynamo-electric machine including a rotatable member and a stationary member, said stationary member including an assembly of laminations comprising arcuate sectors of length of arc not integrally divisible into 360 degrees and having adjacent sector ends arranged in abutting relation to provide a continuous laminated spiral, means including a frame for retaining said laminations in assembled relation, and means including a plurality of pole pieces secured to said laminated core and having field exciting windings arranged thereon for magnetically exciting said dynamo-electric machine.

8. A dynamo-electric machine including a rotatable member and a stationary member, said stationary member having a core including an assembly of laminations of magnetic material comprising arcuate sheet metal sectors, each of said sectors having an arcuate length of slightly more than ninety degrees and having adjacent sector ends arranged in abutting relation to provide a laminated spiral, means including a sheet metal frame arranged about said laminated spiral for retaining said laminations in assembled relation, a plurality of pole pieces arranged in circumferentially spaced relation about the inner periphery of said laminated core and secured to said frame, and means including field exciting windings mounted on said pole pieces for magnetically exciting said dynamo-electric machine.

DEAN F. SMALLEY.